United States Patent
Oliver et al.

(10) Patent No.: US 8,899,539 B2
(45) Date of Patent: Dec. 2, 2014

(54) GUARD ASSEMBLY AND METHOD

(76) Inventors: Edward Antony Oliver, Dana Point, CA (US); William Nichols, Zephyr Cove, NV (US)

(*) Notice: Subject to any disclaimer, the term of this patent is extended or adjusted under 35 U.S.C. 154(b) by 253 days.

(21) Appl. No.: 13/175,806

(22) Filed: Jul. 1, 2011

(65) Prior Publication Data

US 2012/0003418 A1 Jan. 5, 2012

Related U.S. Application Data

(60) Provisional application No. 61/361,513, filed on Jul. 5, 2010.

(51) Int. Cl.
*A47B 96/06* (2006.01)
*F03D 11/00* (2006.01)

(52) U.S. Cl.
CPC .............. F03D 11/00 (2013.01); *Y02E 10/722* (2013.01)
USPC ......... 248/229.1; 248/643; 248/540; 269/165

(58) Field of Classification Search
USPC .............. 248/345.1, 316.5; 269/165; 428/99; 29/525.08
See application file for complete search history.

(56) References Cited

U.S. PATENT DOCUMENTS

| | | | | |
|---|---|---|---|---|
| 2,187,642 A | * | 1/1940 | Brown | 403/399 |
| 2,696,230 A | * | 12/1954 | Libby | 83/439 |
| 3,718,327 A | * | 2/1973 | Nunez | 269/37 |
| 4,034,971 A | * | 7/1977 | Tsuyama | 269/249 |
| 4,832,299 A | * | 5/1989 | Gorton et al. | 248/231.71 |
| 4,947,777 A | * | 8/1990 | Yoder | 114/221 R |
| 5,507,364 A | * | 4/1996 | Spevak | 182/200 |
| 5,960,904 A | * | 10/1999 | Ullmann | 182/45 |
| 6,038,829 A | * | 3/2000 | Franks | 52/645 |
| 6,039,150 A | * | 3/2000 | Palmer | 182/113 |
| 6,044,929 A | * | 4/2000 | Wishner | 182/200 |
| 6,053,284 A | * | 4/2000 | Fountain | 182/180.2 |
| 6,585,080 B2 | * | 7/2003 | Murray | 182/45 |
| 6,976,339 B1 | * | 12/2005 | Riccio et al. | 52/127.1 |
| 7,114,714 B2 | * | 10/2006 | Wong | 269/45 |
| 7,178,777 B1 | * | 2/2007 | Banker | 248/316.7 |
| 7,207,519 B2 | * | 4/2007 | Hoynash | 244/17.11 |
| 7,806,232 B2 | * | 10/2010 | Thomas et al. | 182/45 |
| 7,980,522 B2 | * | 7/2011 | Anderson et al. | 248/316.5 |
| 8,448,923 B1 | * | 5/2013 | Schad et al. | 256/59 |

* cited by examiner

*Primary Examiner* — Terrell McKinnon
*Assistant Examiner* — Daniel Breslin
(74) *Attorney, Agent, or Firm* — George P. White

(57) ABSTRACT

A guard for structural members is disclosed. It can reduce worker injury with a thin sheet metal or plastic, broadly U-shaped guard plate attached to a structural support through attachment to a pair of clamps, each with a primary and a secondary threaded clamp mechanism. The attachment between the guard plate and pair of clamps may be via a slotted intermediate structure. The primary mechanism has a swivel pad end while the secondary clamps have a pointed, cone-shaped end. is the guard can be used in wind turbine towers to protect workers on a fixed ladder from hitting interior flanges as they climb up and as they climb down.

8 Claims, 6 Drawing Sheets

GUARD ASSEMBLY AND METHOD

RELATED APPLICATIONS

This application claims the benefit of priority from U.S. provisional application 61/361,513 filed Jul. 5, 2010, which is hereby incorporated herein by reference in its entirety.

FIELD

This disclosure describes a device attachable to a fixed structure for the purpose of protecting personnel working in tight spaces from head and other types of injury.

BACKGROUND

Utility spaces in fixed structures may have a variety of hazards not present in areas designed for general occupancy. However, even in hard-hat areas covered with warning signs it is still prudent to provide for worker protection from hazards such as low beams. Modification of structural members however is generally to be avoided. It can also be important to allow ready visual inspection of such members.

SUMMARY

An angled, flat guard attached to the member via adjustable clamps can solve the problem of bodily protection in areas requiring blind movement relative to structural members. This can be applied to an inside flange in a cylindrical tower with a fixed ladder, as one example application.

DETAILED DESCRIPTION

Figure 1:
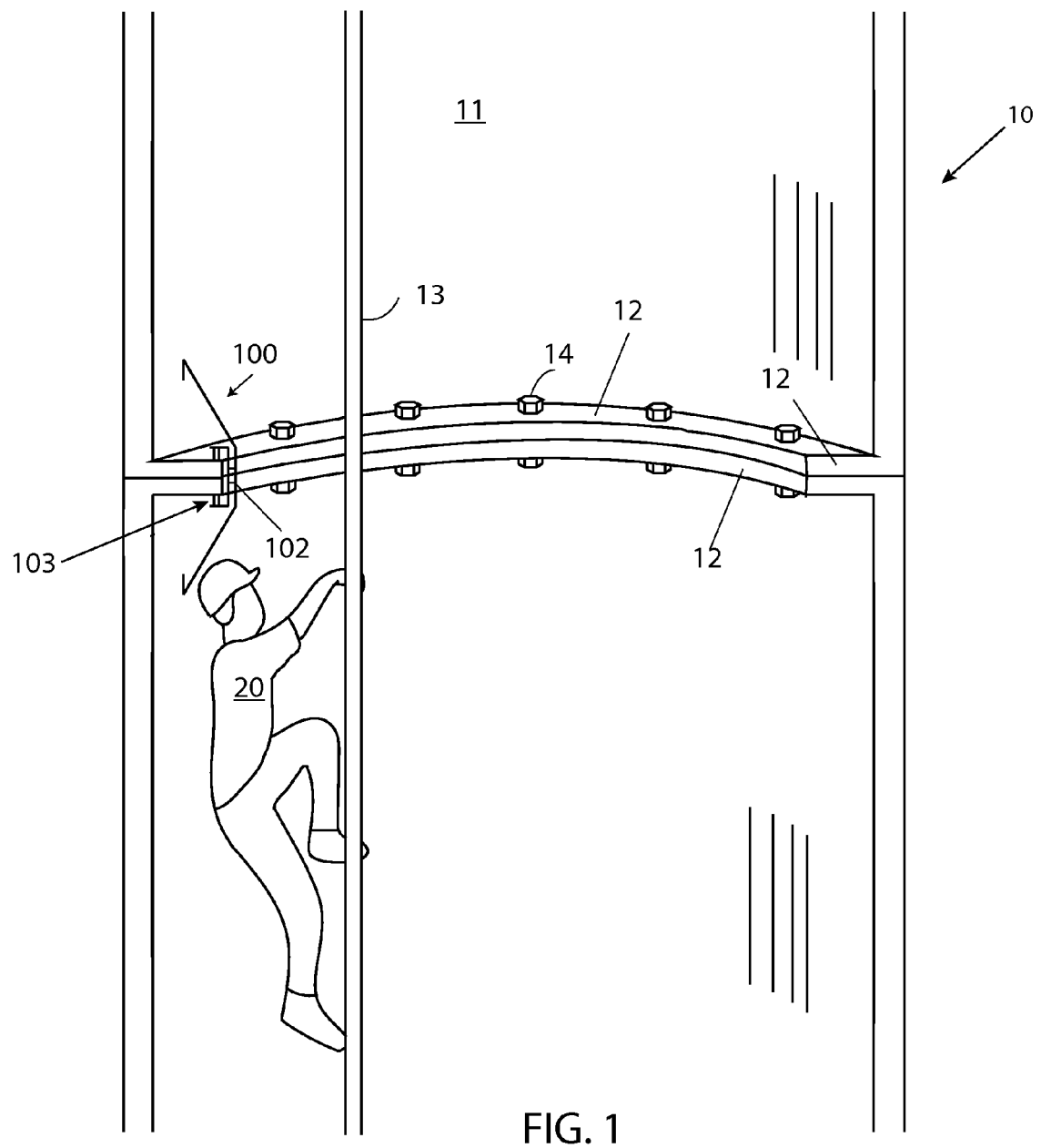
FIG. 1 shows a cut-away side view of a worker climbing a ladder in a tower and approaching a protected flange.

The first embodiment presented is an apparatus for use in a wind turbine tower. FIG. 1 shows a schematic side view of a portion of a tower. The tower 10 is constructed of multiple generally cylindrical hollow tubes connected by inside flanges. In FIG. 1 the tower walls 11 and flanges 12 of two adjoining sections are shown in cross section. The flanges are shown connected by bolts 14. A fixed ladder 13 is used by a worker 20 to get to the top of the tower. The ladder is often close to the inner wall of the tower. If the distance from the flange to the ladder is less than about three feet it can present a hazard to workers climbing the ladder. When climbing upward they are facing away from a protrusion that can be almost directly over their head. Whether climbing up or down, the use of "climb assists" can increase the danger to the workers due to the increased speed at which the worker is moving.

In this embodiment a guard apparatus 100 is used to address this safety issue. The worker's head is deflected away from the hazard above by a sheet metal guard plate 101 at a 60-degree angle from the horizontal axis to the wall. The guard plate 101 shown in FIG. 3 has three regions, including a base region 302 parallel to the major plane of the guard mount 300 and a lower angled sheet metal region 303 at acute angle to the base region. Although possibly not as dangerous, a similar hazard is present as the worker descends. Therefore, the embodiment shown has a symmetric design with a second sheet metal region 301 positioned above the mating of the two flanges. Since the flanges are structural support members they and their mutual connection should preferably not be modified or interfered with in coupling a guard to the structure. In FIG. 1 a pair of clamp assemblies 103 holds mounting bars 102 to the mated flanges. The guard itself 101 is bolted to the mounting bars.

The guard plate in this embodiment can be made of sheet metal or of plastic. As mentioned, the upper region provides an analogous protection for a descending worker. Without this guard a worker might injure their back or their coccyx. Additionally, without this guard a worker's personal fall protection equipment can also become hung up or snagged on the exposed flange bolts and or nuts possibly damaging their personal fall protection equipment and or injuring the worker.

Figure 2:
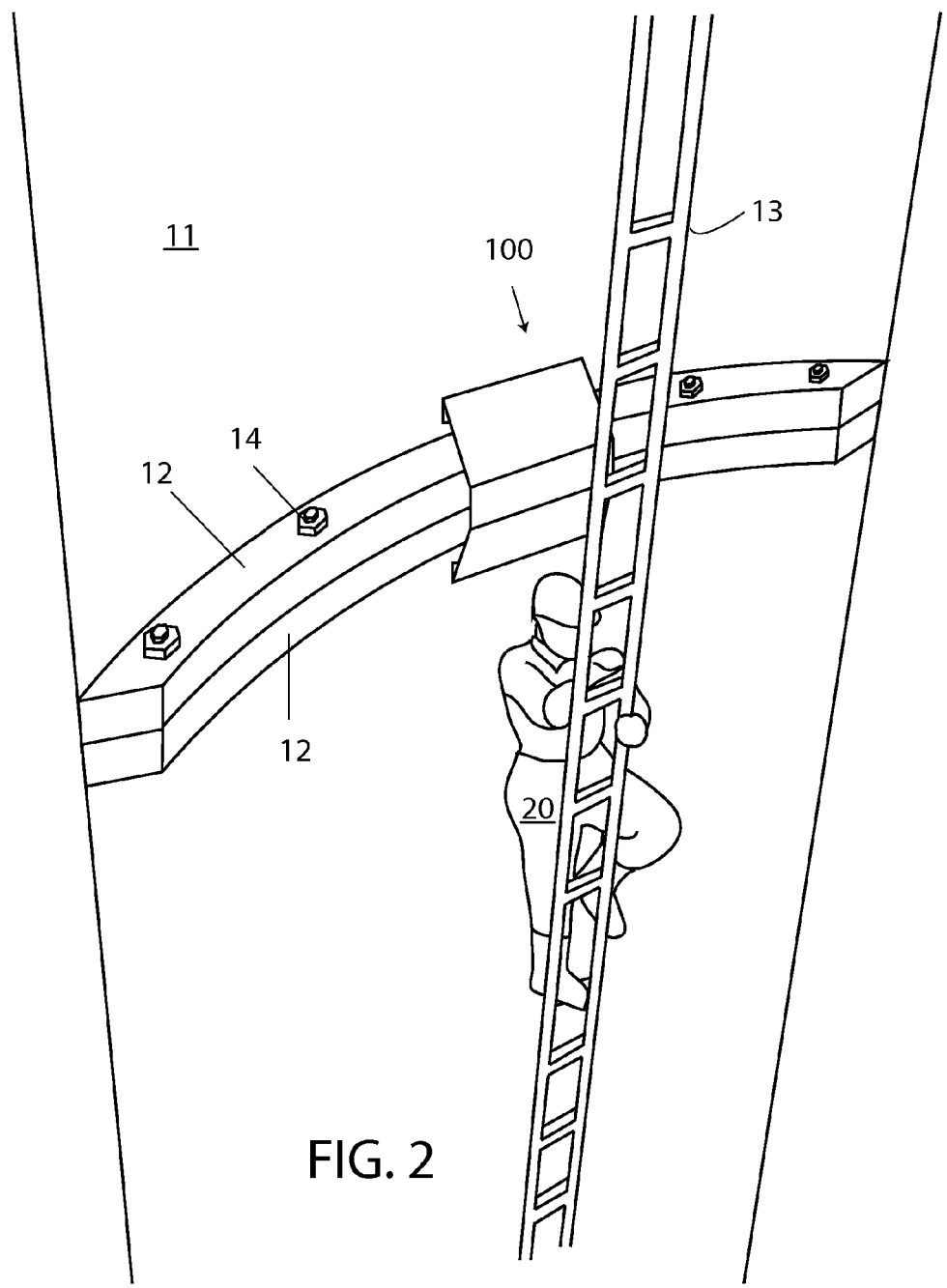
FIG. 2 shows a perspective view of a worker climbing a ladder in a tower.

FIG. 2 shows the scenario of FIG. 1 from a different perspective.

Figure 3:
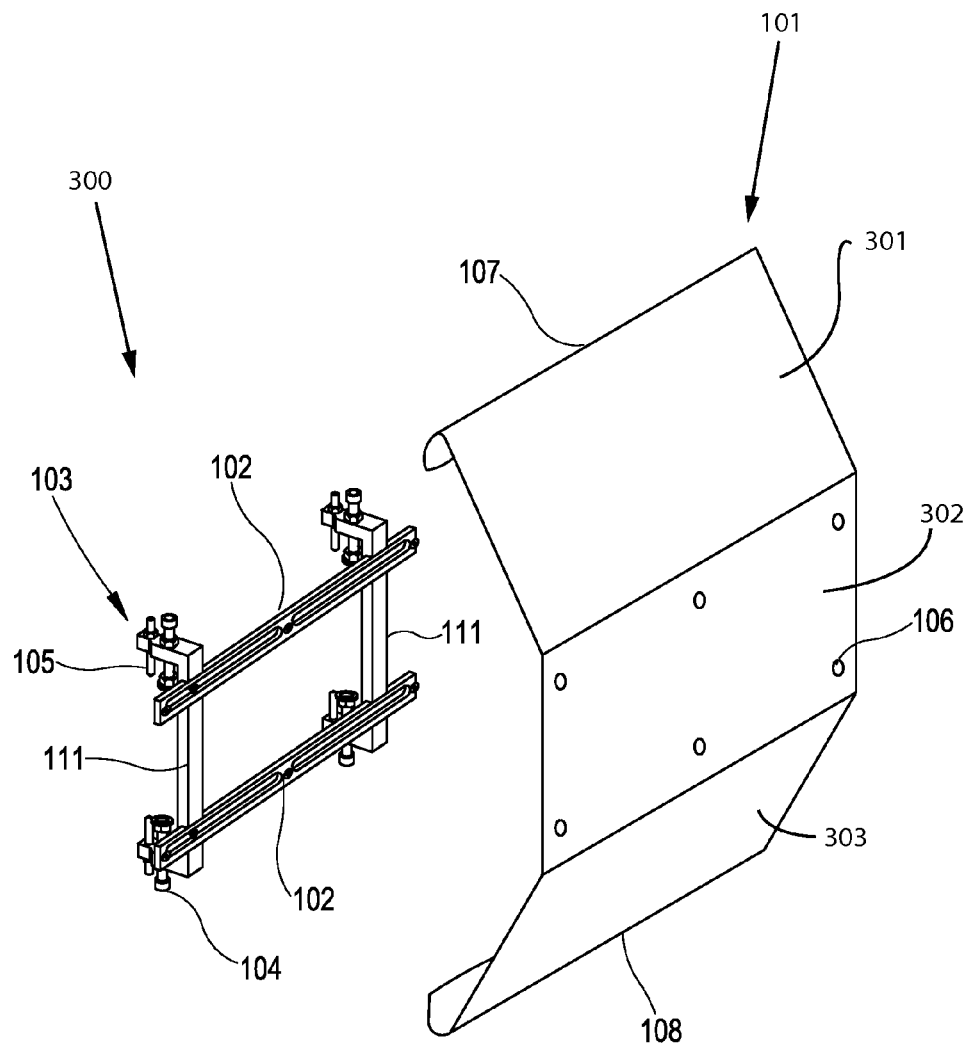
FIG. 3 shows an expanded perspective view of the guard of FIG. 1.
Figure 4:
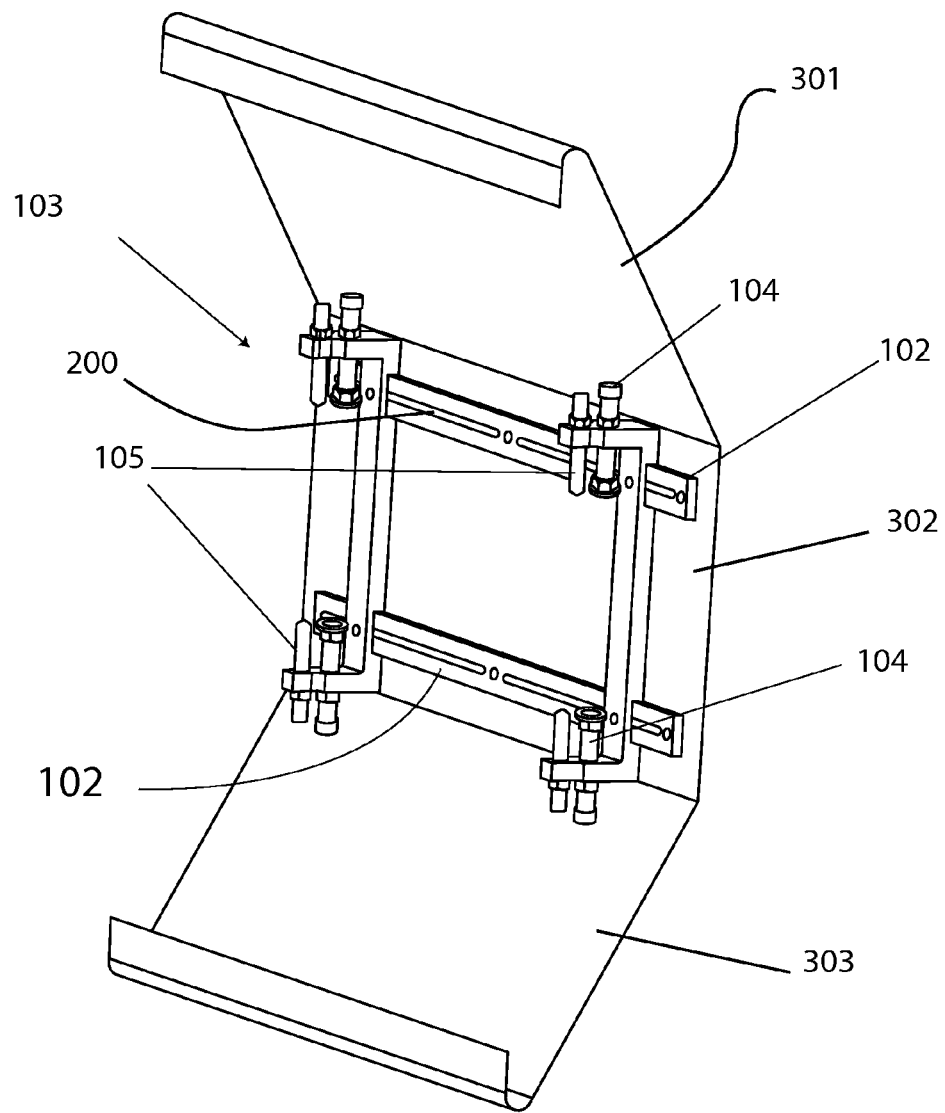
FIG. 4 is a perspective view of the unit of FIG. 3 from the back.

FIG. 3 shows an expanded, exploded, perspective view of this first embodiment of a head guard apparatus 100. There are two clamp assemblies 103, a left and a right unit. The clamp assemblies each connect to both an upper and a lower mounting bar 102. The mounting bars shown in this figure each have a left and a right slot 200 running in the direction of the major axis of the bars. The slots, together, take up substantially all of the length of each bar other than a small region in the center of the bar. Each clamp assembly has a U shaped bar 111 supporting two pairs of threaded screws 104 105 for attaching the whole apparatus to a pair of mated flanges. The two clamp assemblies connected to the two mating bars, as seen on the left side of FIG. 3, are collectively the guard mount 300. FIG. 4 shows the example embodiment from the back with the guard plate secured to the mounting bars. The guard plate itself 101 is secured to the upper and lower mounting bars via bolts 15 through six holes 106 in its central portion. As seen in FIGS. 3 and 4, bolts between the clamps and mounting bar engage the mounting bars' slots. This inherently provides a maximal degree of horizontal positioning of the guard relative to the clamps' locations. Additionally, it therefore provides horizontal positionability between the shield and the particular locations on the flange at which the clamps may be attached at any particular time.

Figure 5:
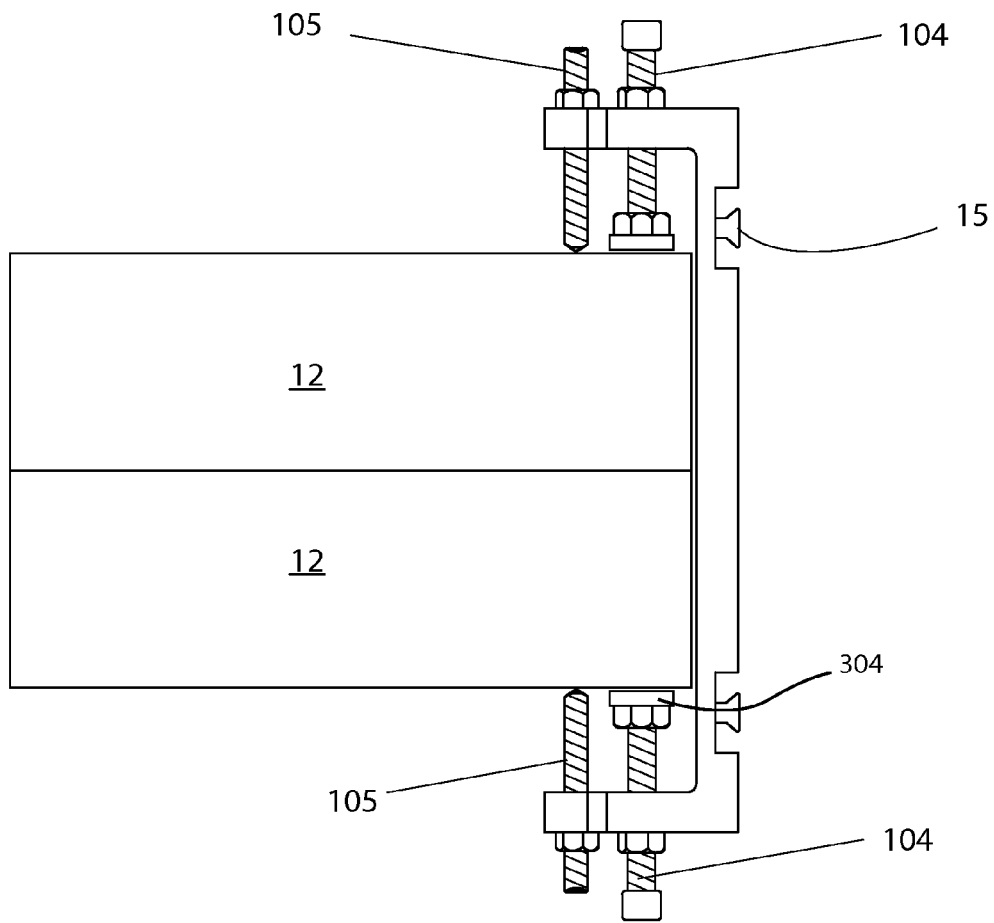
FIG. 5 shows one clamp of the unit of FIG. 3, in isolation, in a side view in a position clamped to the meeting of two flanges.
Figure 6:
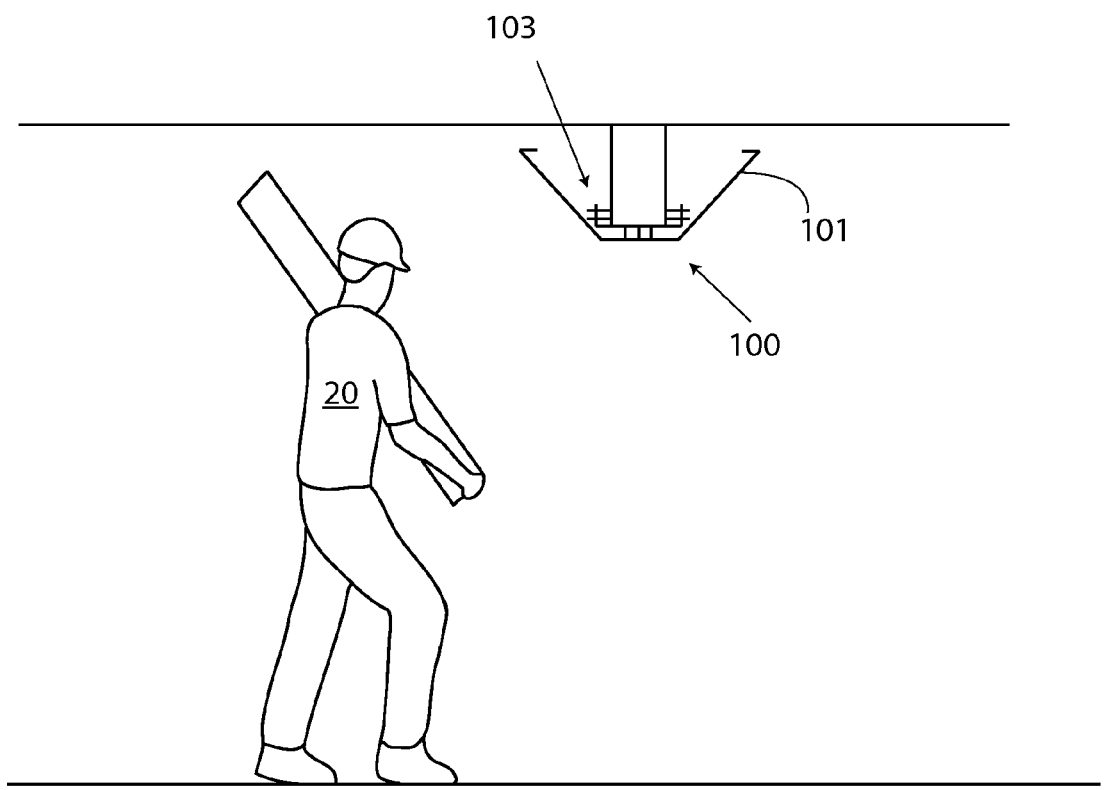
FIG. 6 shows a second embodiment in a hallway.

The clamping is shown in detail in FIG. 5, an expanded view of one of the clamps attached to a pair of flanges. One set of threaded screws 104 are the primary clamping mechanism to attach the guard to the flanges. They are opposing screws with swivel pad feet 304 and locking nuts. The second set of screws 105 are for a secondary clamping for enhanced stability and a "back-up" clamping. A second version for horizontal movement is shown in FIG. 6 and described below in Operations.

Operation

The guard system is installed by first adjusting the two types of threaded clamp screws a primary 104 and a secondary 105 to center the mounting bars relative to the flange. The left and right primary screws 104 are then tightened to a specified torque rating. This is to be adequately secure without harming the flanges in any way—not even cracking any paint. The locking nuts are then tightened to their specified torque. The secondary, pointed screws 105 are then tightened to their specifications.

After inspection of the clamps, as seen in the various drawings, the mounting bars can be secured to the clamps via the mounting bar slots. As is inherent in a slotted structure, a relative horizontal relationship between clamps and the bars can be determined as suitable for the specific installation and established by tightening of the bolts. Then the guard plate is secured to the upper and lower mounting bars 102 with screws through the six holes 106. The lower edge 108 and the upper edge 107 of the guard plate are proximate to the inner wall. When installed, the guard provides a surface with an acute angle relative to the motion of the worker's head as he climbs the ladder. The worker's head is therefore deflected away from the obstruction and toward the ladder by the slope of the guard. Analogously, the workers backside is urged toward the ladder when descending past this point.

For inspection of, or other access to, the flange bolts, the screws holding the guard plate to the mounting bars are removed and full access to the flange is obtained.

A second example is seen in FIG. 6. A worker 20 is shown walking towards a low beam cutting across his path. An elongated version of a guard plate is seen secured to the beam by a clamping assembly 103. If the worker doesn't notice the beam, his hardhat will be pushed downward by the guard plate 101.

Those skilled in the art will be aware of materials, techniques and equipment suitable to produce the example embodiments presented as well as variations on those examples. This teaching is presented for purposes of illustration and description but is not intended to be exhaustive or limiting to the forms disclosed. Many modifications and variations will be apparent to those of ordinary skill in the art. The embodiments and versions help to explain the principles of the invention, the practical application, and to enable others of ordinary skill in the art to understand it. Various embodiments with various modifications as are suited to the particular application contemplated are expected.

In the following claims, the words "a" and "an" should be taken to mean "at least one" in all cases, even if the wording "at least one" appears in one or more claims explicitly. The scope of the invention is set out in the claims below.

What is claimed:

1. A guard system comprising:
  a. a guard mount comprising at least two clamp assemblies; the at least two clamp assemblies each having a primary clamping mechanism and a distinct secondary clamping mechanism where the primary clamping mechanism and the secondary clamping mechanism each, respectively, comprise a pair of opposed, axially aligned, threaded screws with the paired, respective clamping surfaces facing one another; the screws of the primary clamping mechanism being parallel to the screws of the secondary clamping mechanism;
  b. a guard plate coupled to the guard mount; the guard plate being of a bent flat material;
  where the guard plate is operationally couple-able to the at least two clamp assemblies via coupling to at least one elongated mounting bar generally perpendicular to the axes of the axially aligned, threaded screws.

2. The guard system of claim 1 where the clamping surface termini of the primary clamping mechanism's screws is an axially rotatable foot.

3. The guard system of claim 2 wherein the foot comprises a swivel pad.

4. The guard system of claim 3 wherein the foot is self-leveling.

5. The guard system of claim 1 where the termini of the secondary clamping mechanism is a pointed cone shape.

6. The guard system of claim 1 where the guard plate has a central planar portion and at least one planar side portion that is bent up from the plane of the central portion at an acute angle where the side portion is at least about the size of a human head and the location of the coupling of the guard plate to the clamping assembly is within the central portion of the guard plate.

7. The guard system of claim 1 where the operational coupling between the guard plate and the at least one mounting bar is via at least one slot in the mounting bar; the at least one slot being elongated in the elongated direction of the mounting bar.

8. The guard system of claim 4 where the termini of the secondary clamping mechanism is a pointed cone shape.

* * * * *